United States Patent [19]
Kesler

[11] Patent Number: 5,809,692
[45] Date of Patent: *Sep. 22, 1998

[54] METHOD FOR FEEDING PLANT ROOTS

[75] Inventor: Robert H. Kesler, Warsaw, Ind.

[73] Assignee: Haimbaugh Enterprises, Inc., Warsaw, Ind.

[*] Notice: This patent issued on a continued prosecution application filed under 37 CFR 1.53(d), and is subject to the twenty year patent term provisions of 35 U.S.C. 154(a)(2).

[21] Appl. No.: 659,017

[22] Filed: Jun. 4, 1996

Related U.S. Application Data

[62] Division of Ser. No. 176,093, Dec. 30, 1993, Pat. No. 5,533,300.

[51] Int. Cl.$^6$ ................................................. A01G 29/00
[52] U.S. Cl. .............................................................. 47/48.5
[58] Field of Search ........................ 47/48.5 G, 48.5 M, 47/73, 74, 48.5

[56] References Cited

U.S. PATENT DOCUMENTS

| | | | |
|---|---|---|---|
| 419,242 | 1/1890 | Brown | 47/48.5 G |
| 1,791,873 | 2/1931 | Neiman | 47/48.5 G |
| 1,923,677 | 8/1933 | Lovett, Jr. | 47/74 R |
| 1,971,390 | 8/1934 | Van Yahres | 47/48.5 G |
| 2,105,800 | 1/1938 | Watkins | 47/48.5 G |
| 2,145,934 | 2/1939 | Kingman | 47/48.5 M |
| 2,380,721 | 7/1945 | Brigden | 47/48.5 G |
| 3,319,379 | 5/1967 | Groeber et al. | 47/48.5 G |
| 3,755,966 | 9/1973 | Smith | 47/48.5 G |
| 3,821,863 | 7/1974 | Chan | 47/48.5 G |
| 4,056,898 | 11/1977 | Brucato et al. | 47/48.5 |
| 4,726,143 | 2/1988 | Steinbeck | 47/48.5 G |
| 4,785,575 | 11/1988 | Shioi | 47/48.5 G |
| 5,347,753 | 9/1994 | Dall | 47/74 |

FOREIGN PATENT DOCUMENTS

| | | | |
|---|---|---|---|
| 622630 | 6/1961 | Canada | 47/48.5 G |
| 2249463 | 5/1992 | United Kingdom | 47/48.5 G |

Primary Examiner—Michael J. Carone
Assistant Examiner—Joanne C. Downs
Attorney, Agent, or Firm—Lundy and Associates

[57] ABSTRACT

A plant feeder having a water reservoir and a water conduit connected to the reservoir at one end. The other end of the water conduit is adapted to be positioned adjacent the roots of a plant to be fed. The water conduit has a water permeable plug with water soluble plant food therein whereby water can percolate through the conduit from the reservoir to the roots dissolving plant food on its way, and air and insects are blocked from migrating to the roots.

The method provides placing the other conduit end of the plant feeder of the invention below the roots of a recently transplanted plant, percolating water from the reservoir to the roots through water soluble plant food, and blocking the migration of air and insects to the roots through the conduit.

34 Claims, 3 Drawing Sheets

METHOD FOR FEEDING PLANT ROOTS

This is a divisional of application Ser. No. 08/176,093 filed on Dec. 30, 1993 now U.S. Pat. No. 5,533,300.

BACKGROUND OF THE INVENTION

The present invention pertains generally to a device and a method for feeding plants. More particularly, the present invention pertains to a device and method for feeding and watering trees at the roots.

When any plant, shrub or tree is transplanted, whether or not it will be able to survive depends upon being able to receive nourishment through its root structure. And yet, when transplanted, typically, trees and other plants lose a critical percentage of their root structure.

Thus, it is highly desirable to provide an improved device and method for feeding plants to fully develop their root structure after transplanting.

In some geographical areas, trees and other plant life can be transplanted with little or no special attention being given to providing water and nourishment to the transplanted plant life. However, in many other geographical areas, whether or not transplanted plant life lives depends upon the taking of special steps to provide water and nourishment.

Thus, it is highly desirable to provide an improved device and method for feeding plants.

If ground-surface water is provided, as the water seeps or percolates downwardly toward the root level, the roots will receive the water that is required. And, if the soil is rich in nourishment, the soil will provide the necessary nutrients to develop the appropriate leaf structure. However, as water is supplied from the surface of the ground, the root structure will develop upwardly, as the roots reach for the water. Then, if at some later date, surface water is discontinued, the plant, with its surface development of roots, will be unable to reach downwardly into the earth for water.

Thus, it is highly desirable to provide a plant feeding device and method for feeding plants at the roots and below so as to develop roots which will be able to reach downwardly into the earth for water.

Further, as a transplanted tree or other plant starts to grow, leaf development may exceed the ability of the root system to sustain plant life and the plant may wither. Or, in the case of larger trees with balled roots, the transplanted tree may live, but its growth rate will be slowed for two or three years. While the root ball is fairly massive, a considerable part of the root may have been lost when the tree was dug, and a period of several years may be required to develop an adequate root system.

It is therefore highly desirable to provide an improved tree feeding device and method for feeding tree roots for developing those roots upon transplanting into a healthy root system.

In this regard, food and nourishment must be provided directly to the root system to sustain long range growth. The supplying of irrigation and food and nutrients directly to the root ball should be discontinued after the root system has developed adequately to supply water and nutrients to the developing foliage.

Thus, it is highly desirable to provide a plant feeder and method of feeding plants at the root ball which automatically after a period of about a year cease to operate and biodegrade into mulch.

It is finally highly desirable to provide an improved plant feeder and method for feeding plants which incorporates all of the above features of the invention.

SUMMARY OF THE INVENTION

It is an object of the invention to provide an improved plant feeder and method for feeding plants.

It is also an object of the invention to provide an improved plant feeder and method for feeding plant roots.

It is also an object of the invention to provide an improved plant feeder and method for feeding plant roots to fully develop their root structure after transplanting.

It is also an object of the invention to provide an improved plant feeder and method for feeding plants at the roots and below so as to develop roots which will be able to reach downwardly into the earth for water.

It is also an object of the invention to provide an improved plant feeder and method for feeding plant roots for nourishing transplanted trees and other plants to develop a healthy root system.

It is also an object of the invention to provide an improved plant feeder and method for feeding plant roots at the root ball which automatically after a period of about a year cease to operate.

It is also an object of the invention to provide an improved plant feeder and method for feeding plants which is biodegradable into mulch.

It is finally an object of the invention to provide an improved plant feeder and method for feeding plants which incorporates all of the above features of the invention.

In the broader aspects of the invention there is provided a plant feeder having a water reservoir and a water conduit connected to the reservoir at one end. The other end of the water conduit is adapted to be positioned adjacent the roots of a plant to be fed. The water conduit has a water permeable plug with water soluble plant food therein whereby water can percolate through the conduit from the reservoir to the roots dissolving plant food on its way, and air and insects are blocked from migrating to the roots.

The method in its broader aspects provides placing the other conduit end of the plant feeder of the invention below the roots of a recently transplanted plant, percolating water from the reservoir to the roots through water soluble plant food, and blocking the migration of air and insects to the roots through the conduit.

BRIEF DESCRIPTION OF THE DRAWINGS

The above-mentioned and other features and objects of the invention and the manner of attaining them will become more apparent and the invention itself will be better understood by reference to the following description of an embodiment of the invention taken in conjunction with the accompanying drawings wherein.

DESCRIPTION OF SPECIFIC EMBODIMENTS

Figure 1:
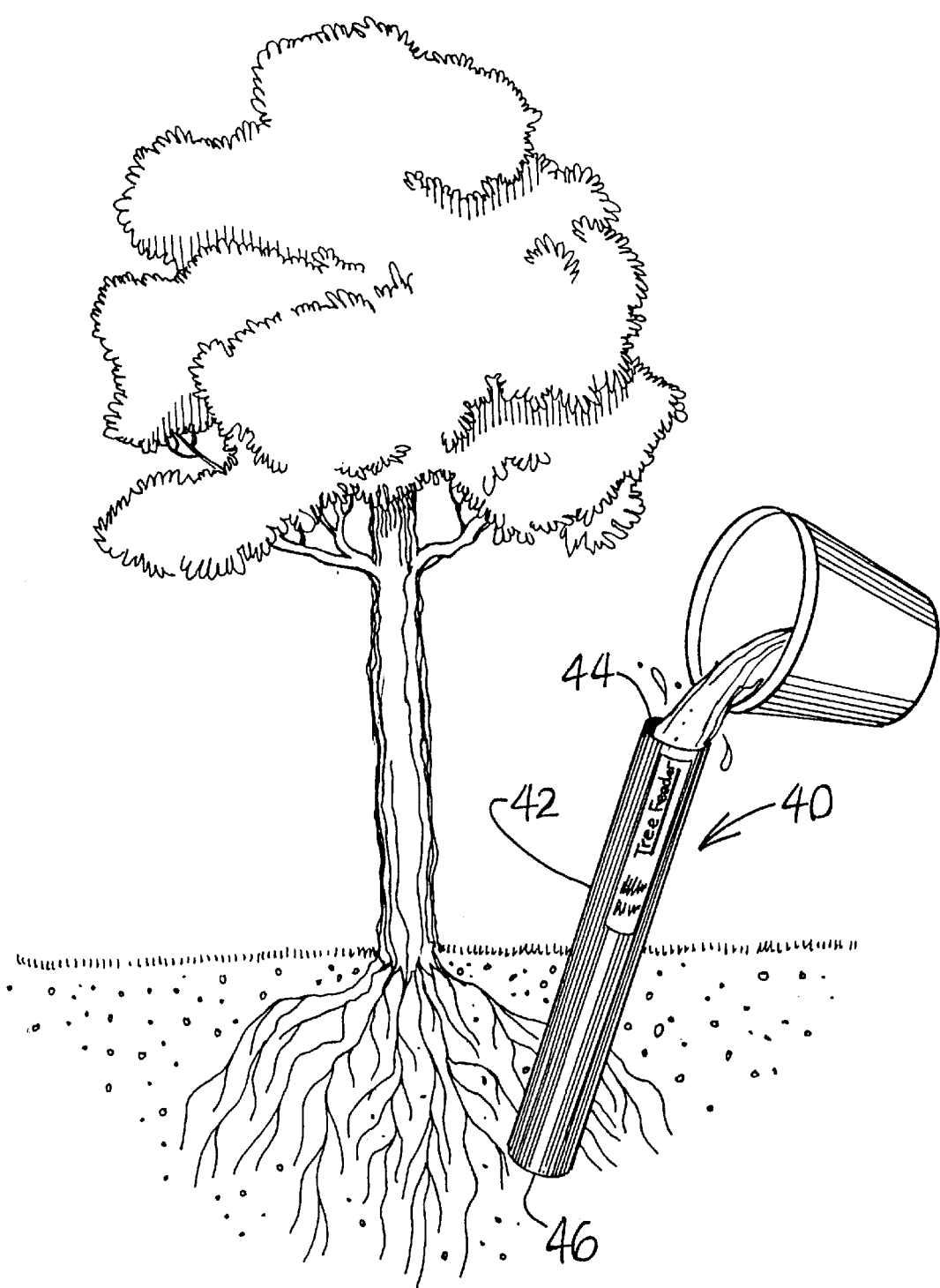
FIG. 1 is a broken away view of a small tree transplanted with the plant feeder of the invention as shown in FIG. 2 properly installed.
Figure 2:
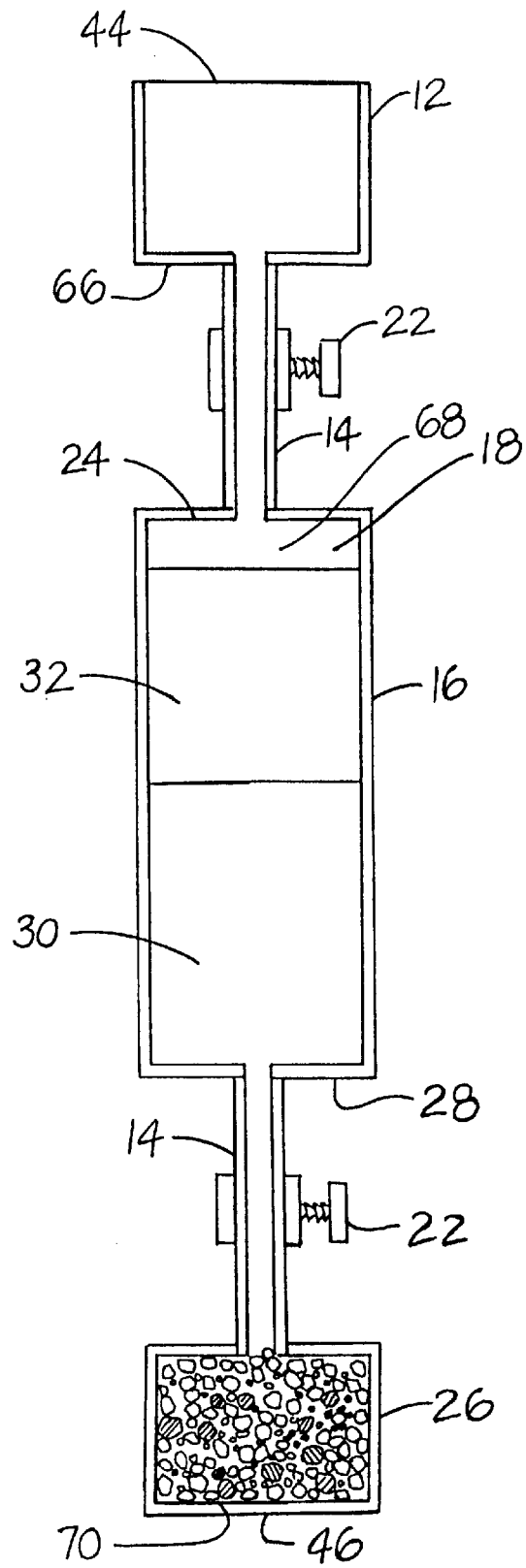
FIG. 2 is a cross-sectional diagrammatic view of of the plant feeder of the invention.

Referring to FIGS. 1 and 2, there is provided a plant feeder 10 shown in FIG. 2 diagrammatically to include a liquid reservoir 12 which is connected by a conduit 14 to an air/insect block 16. Air/insect block 16 is connected to a diffuser 18 by a conduit 20. Both conduits 14 and 20 are equipped with a flow control shown diagrammatically in FIG. 2 as a valve (flow control) 22 which limits the flow through conduits 14 and 20, respectively.

Air/insect block 16 has a top 24 and a bottom 28. At the top 24, air/insect block 16 has a diffuser 26. Adjacent bottom 28, air/insect block 16 has plant nutrients 30. Between the diffuser 26 and the plant nutrients 30, the air/insect block 16 has fertilizer 32.

By the improved plant feeder of the invention, water is collected within the reservoir 12 and passed through the conduit 14 to the air/insect block 16. The flow of water through the conduit 14 is controlled by the flow control 22. Water exiting the conduit 14 into the air/insect block 16 is diffused evenly over the cross-sectional area of the air/insect block 16 by the diffuser 18 such that water percolates through the fertilizer 32 dissolving fertilizer 32 into the water and percolates through the plant nutrients 30 dissolving the plant nutrients 30 into the water. The solubility rates of fertilizer and plant nutrients are such that the resident time of liquid within the air/insect block 16 provides to the water both fertilizer and plant nutrients in the appropriate amounts required by the plants to be fed. The dissolved fertilizer 32 and plant nutrients 30 passes from the air/insect block 16 through the conduit 20 to the diffuser 18 which allows the nutrient and fertilizer laden water to flow to the roots of a plant as shown in FIG. 1. The flow of the liquid through the conduit 20 is controlled by the flow control 22. Flow controls 22 are set in accordance with the flow desired and the fertilizer and nutrients used.

Figure 3:
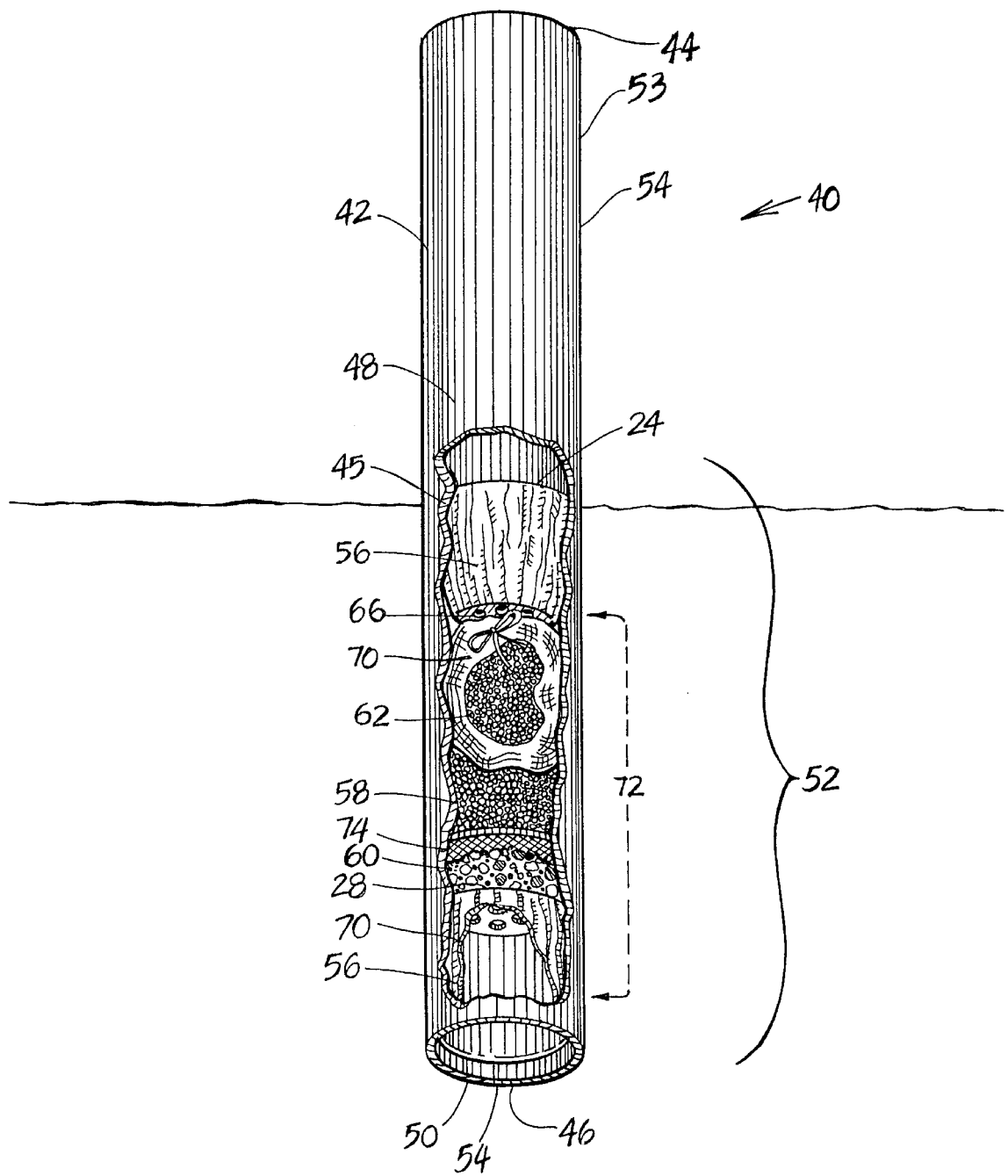
FIG. 3 is a cross-sectional view of a commercial embodiment of the plant feeder of the invention taken substantially along section line 2—2 of FIG. 1.

Referring now to FIGS. 2–3, a commercial embodiment of the improved plant feeder 40 of the invention is shown to include an elongated, hollow housing 42 of biodegradable material having an upper end 44 and a lower end 46. Housing 42 has an exterior surface 48 and interior surface 50 with a water permeable plug 52 positioned therein. Plug 52 extends from adjacent end 46 to adjacent the median position 45 halfway between ends 44, 46 of tubular housing 42. The placement of plug 52 adjacent end 46 defines a water reservoir 53 adjacent end 44 extending from end 44 to plug 52. Tubular housing 42, in specific embodiments, may be rectangular, square, or round or out of round in cross-section.

In a specific embodiment, the elongated tubular housing 42 may be a commercially available cardboard mailing tube which is approximately 4.25 inches in diameter, has a wall thickness of 0.188 inches and is 30.5 inches long. The cardboard tube 42 is totally biodegradable. In a specific embodiment, the cardboard tube 42 is coated with a biodegradable plastic or wax coating 54 rendering the tube impervious to water and slowing the biodegradation of the cardboard tube such that the cardboard tube will remain intact, water impervious and fully functional after being planted below ground as shown in FIG. 1 for about 6 months to about 12 months in moist soil. In this specific embodiment, coating 54 may be applied by dipping the tubular housing 42 into the coating 54 in a fluid form (melt or solution) to completely superimpose coating 54 over the entire exterior surface 48 and interior surface 50 of the housing 42 and allowing the coating 54 to harden prior to positioning plug 52 within the housing 42.

Plug 52 includes a percolation control 56, a water soluble plant, an air/insect block 72, fertilizer component 62, a water soluble plant nutrient component 58, and a diffuser 60. Percolation control 56 in a tubular housing of circular cross-section such as shown in FIG. 3 may be provided by a pair of spaced apart, rigid disks 64 of fine filter material which are wedged into the tubular housing 42 to completely extend between the interior surface 50 and completely enclose the interior passage of housing 42. One of the disks 64 is positioned adjacent the median position 45 of housing 42 and defines bottom 66 of water reservoir 53 and top 68 of plug 52. The other percolation control 56 is positioned adjacent end 46 and defines bottom 70 of plug 52.

Percolation controls 56, in a specific embodiment, may be formed of compressed peat moss to the desired thickness necessary to control the percolation of water through the tubular housing 42 at the desired rate. The desired rate depends upon the fertilizer 62 and plant nutrients 58 used, their solubility in water, and the desired rate of feeding the roots of the plant. In all embodiments, the desired rate of percolation approximates the desired feeding rate, and is always less than that which will damage the roots. Disks 64 also act to retain the plant fertilizer 62 and nutrients 58 and the diffuser 60 therebetween within housing 42.

In specific embodiments having circular cross-sections, conventional peat pots are used for percolation controls 56. In the embodiment shown in FIG. 3, a peat pot is wedged into tubular housing 42 adjacent end 46 with its open end downwardly facing, and an additional peat pot is wedged into tubular housing 42 with its open end upwardly facing end 44 adjacent the median position 45. The side walls of the peat pot assist the peat pot in being frictionally held at the proper position within tubular housing 42.

In one specific embodiment such as shown in FIG. 3 in which the tubular housing 42 is about 30 inches long, the median peat pot is positioned approximately 19.5 inches from the top end 44 of the tubular housing 42 and the bottom peat pot is positioned about 3.8 inches from end 46 of the tubular housing 42 leaving a distance of about 7.2 inches therebetween for the air/insect block 72 and the diffuser 60.

The air/insect block 72 is positioned between the percolation controls 56 and includes three separately identifiable components. The component closest to end 44 is a plant food component. The component most adjacent end 46 is a diffuser component 60. The plant fertilizer component 62 includes a plant nutrient component 58 and a plant fertilizer component 62.

In the specific embodiment of FIG. 3, plant fertilizer component 62 is placed adjacent the percolation control 56 which is adjacent the median position 45 of tubular housing 42. The diffuser 60 is positioned adjacent the percolation control disk 56 adjacent end 46. The plant nutrient component 58 is positioned between the plant fertilizer component 62 and the diffuser component 60. Together, the plant fertilizer component 62, the plant nutrient component 58 and the diffuser 60 comprise the air/insect block 72 through which neither air nor insects can migrate.

Specifically referring to the fertilizer component 62, this component includes water soluble, granular fertilizer material. In a specific embodiment, the fertilizer material is a mixture of nitrogen, ph adjusters, bonemeal, phosphorus, vitamin B-12, ferrous sulfate and potash having an analysis from about 5 to about 10, about 12 to about 20, about 5 to about 10 in granular form.

To isolate the fertilizer 62 from the remaining components and the side walls, the particulate fertilizer material, in a specific embodiment, is placed within a biodegradable container 70. In a specific embodiment, this container is a bag of cloth, paper, or other porous or solid, water permeable material. The bag isolates the fertilizer from housing 42 and also prevents the particulate fertilizer material from moving axially with the flow of water through the housing 42. All of the fertilizer is maintained in the fertilizer component 62 until dissolved by the water percolating therethrough.

In all embodiments, sufficient fertilizer is contained in fertilizer component 62 to provide fertilizer material by way of the water flowing through the same, dissolving a portion thereof, and transporting the dissolved portion to the roots for a period of time ranging from about 6 months to about 12 months after the improved plant feeder 40 is installed. In specific embodiments, both the analysis of the fertilizer differs and the amount of fertilizer differs as to each specific plant with which the plant feeder 40 is being used. The specific amount of fertilizer ranges from about 3 to about 16 ounces of fertilizer.

In a specific embodiment, the diffuser component 60 comprises a plug of relatively coarse, biodegradable, or naturally occurring particulate material held between a coarse filter 74 and percolation control 56. Diffuser component 60 acts to disperse the liquid percolating through the plant feeder 40 to present to the roots moisture over the entire cross-section of housing 42. In a specific embodiment, the particulate filter material may extend axially of housing 42 from about 2 inches to about 6 inches and be of particulate material less than about 2 inches in largest dimension, such as wood chips, paper pulp, gravel or the like. In a specific embodiment, coarse filter 74 may be a disc of window screen.

Between the diffuser component 60 and the fertilizer component 62, is a nutrient component 58. In a specific embodiment, component 58 comprises a spongy filter tangled filament material compressed between the fertilizer component 62 and the diffuser component 60 intermixed with root stimulators and plant starters and nutrients. The intertangled filament material provides an inpenetrable air/insect block which prevents air and insects from migrating from the atmosphere to the roots, while at the same time, through absorption and capillary phenomena, allows the water to percolate at the rate controlled by the percolation controls 56. The compressed intertangled filament filter material also acts as both a sponge and a matrix to contain root stimulators and plant starters and other nutrients, of both a particulate and liquid variety. In a specific embodiment, these include ferrous sulfate, bonemeal and vitamin B12 and root stimulators such as plant starter, manufactured and distributed by Ortho Chemical Company.

In a specific embodiment, the spongy intertangled filament filter material is a plug of sphagnum moss extending axially of the tubular housing 42 about 2 to about 6 inches.

In looking at the comparable properties of the percolation controls 56, the air/insect block 72 and the various components 58, 60, 62 thereof, it is apparent that compressed spongy intertangled filament filter material of the plant nutrient segment 58 is the least water permeable of all of the components and is impervious to air and insects, but allows water to percolate therethrough by capillary action and is a relatively fine rather than coarse filter material allowing only that what is soluble in the water to percolate therethrough. The percolation controls 56, on the other hand, are more pervious to air than the compressed intertangled filament filter material of component 58, but less pervious to air than the particulate fertilizer of fertilizer component 62 and still further less pervious to air than the relatively coarse, particulate material of the diffuser component 60. In contrast, the compressed intertangled filament filter material which is the most impervious to the passage of air therethrough is less pervious to the percolation of water therethrough than the percolation controls 56. However, both the particulate fertilizer material and the particulate material of the diffuser 60 are more pervious to the flow of water than the compressed intertangled filament filter material of the component 58.

Thus, the intertangled filament filter material of component 58 or the combination of the diffuser component 60, the nutrient component 58, and the fertilizer component 62 can be referred to as an air block or an air/insect block 72, inasmuch as that section of the plug 52 within the housing 42 of the plant feeder 40 is totally impervious to air flow. Similarly, the disks 64 can be called percolation controls because they are the least permeable to water flow through the housing 42 when compared to the fertilizer component 62, the nutrient component 58 or the diffuser component 60.

In use, the plant feeder 10 is buried with the root ball of a transplanted plant shown in FIG. 1. End 46 of the plant feeder 10 of the invention is positioned adjacent the lower end of the root ball. Upper end 44 of the plant feeder 10 is positioned above ground level. In a specific embodiment, approximately half of the plant feeder 10 is above ground and one-quarter of the plant feeder 10 is below ground.

The portion of plant feeder 10 between upper end 14 and the percolation control 56 adjacent the median position 45 defines a water reservoir 53 which is filled upon installation. Reservoir 53, in a specific embodiment, will contain approximately one gallon of water. The percolation controls 56 and the air/insect block 16 allow water to percolate from the water reservoir 53 through the housing 42 to the roots of the plant. The percolation of water through the housing 42 is always less than the percolation of ground water through the soil to the roots. However, by the percolation of the water through the housing 42, fertilizer from the fertilizer component 32 is dissolved in the water and plant nutrients from the nutrient component 30 are dissolved in the water, and both the fertilizer and nutrients are delivered to the roots evenly through the diffuser 60.

As the water flows through the plant feeder 10 at the rate controlled by the percolation controls 56 the water dissolves the fertilizer and nutrients and delivers the same in an even flow throughout the cross-section of the housing 42 through the diffuser component 60 to the roots of the plant. Inasmuch as the percolation is relatively slow, no soil is eroded from the roots. Since the majority of moisture to the roots is supplied by ground water percolating through the soil, the roots are amply supplied moisture by ground water. However, since the plant feeder 10 of the invention provides not only some moisture, but most of the nutrients, fertilizer and the like to the lower segment of the roots, the roots are urged to grow downwardly to provide a healthy root growth which can withstand drought while at the same time eliminate the problems of stress and trauma associated with uprooting a plant from one environment and transplanting it to another environment.

By the plant feeder 10 of the invention, the root structure of a healthy plant can be regenerated after transplanting so that healthy leaf structure will result. The root system and the leaf structure will develop faster with the plant feeder 10 of the invention than without any feeding device. Within 6 to 12 months, the plant feeder 10 of the invention stops functioning, biodegradates into mulch, disappears and needs no further attendance.

While a specific embodiment of the invention has been shown and described herein for purposes of illustration, the protection afforded by any patent which may issue upon this application is not strictly limited to the disclosed embodiment; but rather extends to all structures and arrangements which fall fairly within the scope of the claims which are appended hereto:

What is claimed is:

1. A method for feeding plants comprising the steps of providing a housing having opposite open ends, placing one housing end below ground and adjacent the roots of a plant, placing the other housing end above ground, percolating water through said housing from above ground to said roots using a water permeable plug positioned within said housing and defining with said housing a water reservoir having vacant space between said plug and said other above ground end and an above ground fill opening at said other above ground housing end, said housing having exterior walls generally impervious to water flow, whereby water flows from said water reservoir longitudinally through said housing and out said one below ground open end, said plug having a percolation control therein which controls the rate of water flow through said housing, whereby water from said water reservoir and dissolved plant food may be percolated through said housing and delivered to the roots of a plant at a desired feeding rate.

2. The method of claim 1 further comprising a diffuser in said housing adjacent said other end, said diffuser spreading generally evenly the flow of water over the cross-section of said housing.

3. The method of claim 2 wherein said diffuser is a plug of compressed peat moss within said housing.

4. The method of claim 3 wherein said plug of compressed peat moss is a conventional peat pot.

5. The method of claim 2 wherein said diffuser is a plug of packed particulate material within said housing.

6. The method of claim 5 wherein said particulate material is chosen from the group consisting of wood chips, paper pulp, gravel, and combinations thereof.

7. The method of claim 1 wherein said percolation control is a plug of compressed peat moss.

8. The method of claim 7 wherein the percolation control is a conventional peat pot within said housing.

9. The method of claim 1 further comprising the step of blocking the flow of air and the migration of insects through said housing using an air/insect block in said housing, said air/insect block being positioned between said reservoir and said other end, said air/insect block having a percolation control and a diffuser on opposite sides thereof.

10. The method of claim 9 wherein said air/insect block comprises a plug of packed water soluble plant food.

11. The method of claim 10 wherein said plant food includes fertilizer having an analysis from about 5 to about 10 Nitrogen, from about 12 to about 20 Phosphorous, from about 5 to about 10 Potash.

12. The method of claim 11 wherein said fertilizer is isolated from said housing by a container.

13. The method of claim 12 wherein said container is chosen from the group consisting of paper and cloth bags.

14. The method of claim 10 wherein said plant food is chosen from the group consisting of ph adjusters, nitrogen suppliers, potash, phosphorus, nutrients, and combinations thereof.

15. The method of claim 14 wherein said nutrients are chosen from the group consisting of sphagnum moss, Vitamin B-12, bonemeal and Ferrous Sulphate.

16. The method of claim 10 wherein said plant food includes nutrients, said nutrients being held in said housing by a matrix capable of holding both fluid and particulate materials.

17. The method of claim 16 wherein said matrix is a plug of compressed sphagnum moss within said container.

18. The method of claim 1 further comprising the step of blocking the flow of air and the migration of insects through said housing using an air/insect block in said housing, said housing being a cardboard tube, said percolation control and air/insect block and plant food being in the lower portion of said tube, said upper portion of said tube being said water reservoir.

19. The method of claim 18 wherein said tube and every element therein is biodegradable.

20. The method of claim 18 wherein said tube is coated with a material rendering said tube impervious to water and biodegradable in wet soil over a period of time ranging from about 6 months to 12 months.

21. The method of claim 20 wherein said coating material is chosen from the group consisting of waxes and polymeric materials.

22. The method of claim 1 wherein the percolation of water through said plant feeder is approximately the desired feeding rate.

23. The method of claim 1 further comprising the step of blocking the flow of air and the migration of insects through said housing using an air/insect block in said housing, said air/insect block comprising a percolation control, a diffuser, plant fertilizer, and plant nutrients in the form of plugs stacked contiguous to each other within said housing.

24. A method for feeding plants comprising the steps of providing an elongated housing having opposite open ends, placing one housing end below ground and adjacent the roots of a plant, placing the other housing end above ground, percolating water through said housing from above ground to said roots and blocking the flow of air and the migration of insects through said housing using a water permeable plug positioned within said housing adjacent said below ground end defining with said housing a water reservoir and an above ground fill opening at said other above ground open end, said housing having exterior walls impervious to water flow, whereby water flows from said water reservoir longitudinally through said housing and out said below ground open end, said plug having a percolation control therein which controls the rate of water flow through said housing, said plug having water soluble plant food therein whereby water from said water reservoir and dissolved plant food may be percolated through said housing and delivered to the roots of a plant to be fed at a desired feeding rate, said housing having an air/insect block therein which inhibits the flow of air and the migration of insects through said housing, said air/insect block being positioned between said reservoir and said below ground end.

25. The method of claim 24 wherein said plant food is chosen from the group consisting of ph adjusters, nitrogen suppliers, potash, phosphorus, nutrients, and combinations thereof.

26. The method of claim 24 wherein said plant food includes nutrients, said nutrients being held in said housing by a matrix capable of holding both fluid and particulate materials.

27. The method of claim 26 wherein said nutrients are chosen from the group consisting of sphagnum moss, Vitamin B-12, Bonemeal and Ferrous Sulphate.

28. The method of claim 24 wherein said plant food includes fertilizer having an analysis from about 5 to about 10 Nitrogen, from about 12 to about 20 Phosphorous, from about 5 to about 10 Potash.

29. The method of claim 28 wherein said fertilizer is isolated from said housing by a container.

30. The method of claim 29 wherein said container is chosen from the group consisting of paper and cloth bags.

31. The method of claim 24 wherein said housing is a cardboard tube, said percolation control and air/insect block and plant food being in the lower portion of said tube, said upper portion of said tube being said water reservoir.

32. The method of claim 31 wherein said tube and every element therein is biodegradable.

33. The method of claim 31 wherein said tube is coated with a material rendering said tube impervious to water and biodegradable in wet soil over a period of time ranging from about 6 months to 12 months.

34. The method of claim 33 wherein said coating material is chosen from the group consisting of waxes and polymeric materials.

* * * * *